United States Patent
Lewis et al.

(10) Patent No.: US 10,484,379 B2
(45) Date of Patent: Nov. 19, 2019

(54) SYSTEM AND METHOD FOR PROVIDING LEAST PRIVILEGE ACCESS IN A MICROSERVICES ARCHITECTURE

(71) Applicant: MOTOROLA SOLUTIONS, INC., Chicago, IL (US)

(72) Inventors: Adam C. Lewis, Buffalo Grove, IL (US); Shanthi E. Thomas, Hoffman Estates, IL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 184 days.

(21) Appl. No.: 15/461,299

(22) Filed: Mar. 16, 2017

(65) Prior Publication Data
US 2018/0270237 A1    Sep. 20, 2018

(51) Int. Cl.
*H04L 29/06*    (2006.01)
*H04L 9/08*    (2006.01)
(Continued)

(52) U.S. Cl.
CPC .............. *H04L 63/10* (2013.01); *H04L 9/085* (2013.01); *H04L 9/088* (2013.01); *H04L 9/0891* (2013.01); *H04L 9/0894* (2013.01); *H04L 63/04* (2013.01); *H04L 63/06* (2013.01); *H04L 63/067* (2013.01); *H04W 12/04* (2013.01); *G06F 15/16* (2013.01); *H04L 63/061* (2013.01); *H04L 63/062* (2013.01); *H04L 63/08* (2013.01)

(58) Field of Classification Search
None
See application file for complete search history.

(56) References Cited

U.S. PATENT DOCUMENTS 5,481,613 A * 1/1996 Ford ..................... H04L 9/0841
380/277
5,623,546 A    4/1997 Hardy et al.
(Continued)

OTHER PUBLICATIONS

Basney et al.; The MyProxy online credential repository; 2005; Obtained from the Internet <URL: https://onlinelibrary.wiley.com/doi/abs/10.1002/spe.688>; pp. 1-16, as printed. (Year: 2005).*

(Continued)

*Primary Examiner* — Saleh Najjar
*Assistant Examiner* — Michael W Chao
(74) *Attorney, Agent, or Firm* — Michael Best & Friedrich LLP

(57) ABSTRACT

System and method of providing administrative access to an endpoint server. In one example, the method includes receiving, at an admin server, a request for performing an admin operation on the endpoint server and a first portion of an admin key from a microservice server. The method also includes receiving, at the admin server, a second portion of the admin key. The method further includes generating, at the admin server, a copy of the admin key based at least in part on the first portion and the second portion of the admin key. The method also includes performing, via the admin server, the admin operation on the endpoint server using the copy of the admin key. The method further includes deleting the copy of the admin key on the admin server after performing the admin operation on the endpoint server.

16 Claims, 5 Drawing Sheets

(51) Int. Cl.
*H04W 12/04* (2009.01)
*G06F 15/16* (2006.01)

(56) References Cited

U.S. PATENT DOCUMENTS

| | | | |
|---|---|---|---|
| 6,959,394 B1 | 10/2005 | Brickell et al. | |
| 7,136,489 B1* | 11/2006 | Madhusudhana | H04L 9/085 380/277 |
| 7,146,009 B2* | 12/2006 | Andivahis | H04L 63/06 380/277 |
| 7,343,014 B2* | 3/2008 | Sovio | H04L 9/0827 380/278 |
| 7,599,493 B2 | 10/2009 | Sandhu et al. | |
| 7,770,212 B2* | 8/2010 | Le Saint | G06F 21/445 713/193 |
| 8,190,905 B1* | 5/2012 | Chang | H04L 63/0428 380/286 |
| 8,819,768 B1 | 8/2014 | Koeten et al. | |
| 9,209,972 B2* | 12/2015 | D'Souza | H04L 9/0825 |
| 9,326,145 B2* | 4/2016 | Awan | H04L 63/107 |
| 9,667,416 B1* | 5/2017 | Machani | H04L 9/0822 |
| 9,703,965 B1* | 7/2017 | Robinson | G06F 21/602 |
| 9,948,623 B2* | 4/2018 | Davoust | H04L 63/20 |
| 2003/0081785 A1* | 5/2003 | Boneh | H04L 9/847 380/277 |
| 2003/0147536 A1* | 8/2003 | Andivahis | H04L 63/06 380/277 |
| 2003/0172280 A1* | 9/2003 | Scheidt | H04L 63/0442 713/182 |
| 2006/0248333 A1* | 11/2006 | Sandhu | H04L 9/0825 713/155 |
| 2007/0014400 A1* | 1/2007 | Wack | H04L 9/085 380/44 |
| 2007/0180259 A1* | 8/2007 | Bulot | G06Q 50/22 713/183 |
| 2009/0092252 A1* | 4/2009 | Noll | H04L 9/083 380/277 |
| 2010/0235638 A1* | 9/2010 | Irvine | H04L 9/085 713/168 |
| 2011/0093934 A1* | 4/2011 | Le Saint | G06F 21/445 726/5 |
| 2012/0060033 A1 | 3/2012 | Giuliani et al. | |
| 2012/0210135 A1* | 8/2012 | Panchapakesan | H04L 9/0822 713/172 |
| 2012/0233674 A1 | 9/2012 | Gladstone et al. | |
| 2013/0268774 A1* | 10/2013 | O'Hare | G06F 9/455 713/189 |
| 2013/0305057 A1* | 11/2013 | Greco | G06F 21/80 713/189 |
| 2015/0271146 A1 | 9/2015 | Holyfield et al. | |
| 2015/0349958 A1* | 12/2015 | Lindell | H04L 9/085 713/168 |
| 2016/0119291 A1 | 4/2016 | Zollinger et al. | |
| 2016/0212109 A1* | 7/2016 | Hird | H04L 63/062 |
| 2017/0187523 A1* | 6/2017 | Andrews | H04L 63/00 |
| 2018/0234251 A1* | 8/2018 | Oberheide | H04L 9/3247 |
| 2019/0109711 A1* | 4/2019 | Gladwin | G06F 3/0659 |
| 2019/0199521 A1* | 6/2019 | Sayers | H04L 9/0819 |

OTHER PUBLICATIONS

PCT/US2018/018633 International Search Report and Written Opinion of the International Searching Authority dated Apr. 25, 2018 (12 pages).

* cited by examiner

SYSTEM AND METHOD FOR PROVIDING LEAST PRIVILEGE ACCESS IN A MICROSERVICES ARCHITECTURE

BACKGROUND OF THE INVENTION

Services (for example, microservices) often need to perform admin operations on endpoint services such as application servers, microservices, and databases. A microservice requires administrative level access to endpoint service to perform an admin operation. Typically, a microservice stores admin credentials for the endpoint service in an unsecure internal memory. The perpetual storage of sensitive data in an unsecure location makes the service a prime target for hackers to obtain uncontrolled administrative level access to the endpoint service. A method is needed to enable a microservice to run as an unprivileged user, and to temporarily elevate to the privilege level needed to perform a task and then drop the privilege level immediately.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
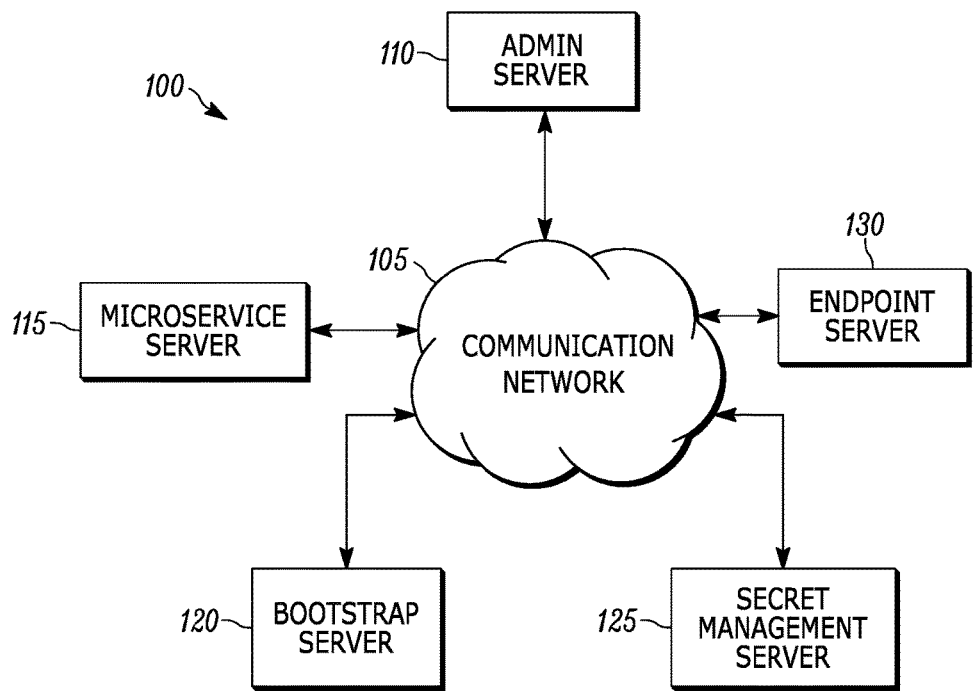
FIG. 1 is a diagram of a communication system in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

One embodiment provides a method of providing administrative access to an endpoint server. In one example, the method includes receiving, at an admin server, a request for performing an admin operation on the endpoint server and a first portion of an admin key from a microservice server. The method also includes receiving, at the admin server, a second portion of the admin key. The method further includes generating, at the admin server, a copy of the admin key based at least in part on the first portion and the second portion of the admin key. The method also includes performing, via the admin server, the admin operation on the endpoint server using the copy of the admin key. The method further includes deleting the copy of the admin key on the admin server after performing the admin operation on the endpoint server.

Another embodiment provides a system of providing administrative access to an endpoint server. In one example, the system includes a microservice server and an admin server. The admin server includes an admin transceiver, an admin memory, and an admin electronic processor. The admin electronic processor is electrically coupled to the admin transceiver and to the admin memory. The admin electronic processor is configured to receive, via the admin transceiver, a request for performing an admin operation on the endpoint server and a first portion of an admin key from the microservice server. The admin electronic processor is also configured to receive, via the admin transceiver, a second portion of the admin key. The admin electronic processor is further configured to generate a copy of the admin key based at least in part on the first portion and the second portion of the admin key. The admin electronic processor is also configured to perform the admin operation on the endpoint server using the copy of the admin key. The admin electronic processor is further configured to delete the copy of the admin key stored in the admin memory after performing the admin operation on the endpoint server.

For ease of description, each of the example systems presented herein is illustrated with a single exemplar of each of its component parts. Some examples may not describe or illustrate all components of the systems. Other example embodiments may include more or fewer of each of the illustrated components, may combine some components, or may include additional or alternative components.

FIG. 1 is a diagram of one embodiment of a communication system 100. In the example shown, the communication system 100 includes a communication network 105, an admin server 110, a microservice server 115, a bootstrap server 120, a secret management server 125, and an endpoint server 130. The communication network 105 may be a wired network, a wireless network, or both. All or parts of the communication network 105 may be implemented using various networks, for example, a cellular network, the Internet, a Bluetooth™ network, a wireless local area network (for example, Wi-Fi), a wireless accessory Personal Area Networks (PAN), a machine-to-machine (M2M) autonomous network, and a public switched telephone network. The admin server 110 and the plurality of other components in the communication system 100 communicate with each other over the communication network 105 using suitable wireless or wired communication protocols. In some embodiments, communications with other external devices (not shown) occur over the communication network 105.

Figure 2:
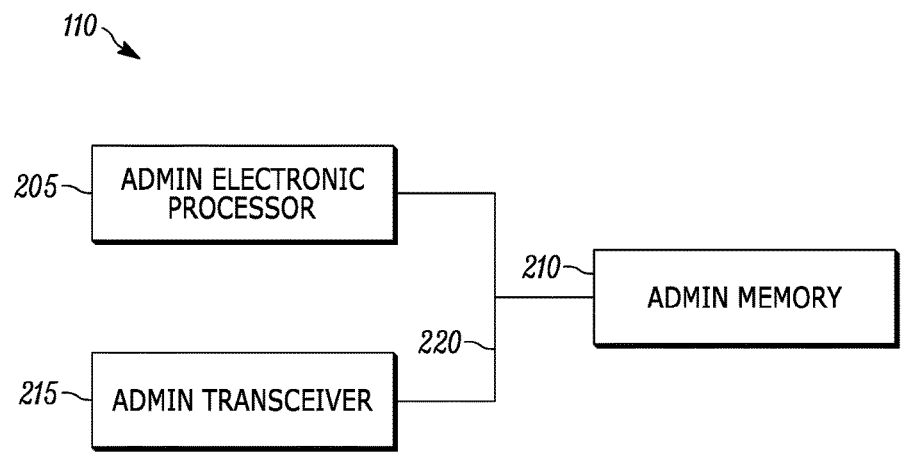
FIG. 2 is a diagram of an admin server included in the communication system of FIG. 1, in accordance with some embodiments.

FIG. 2 is a diagram of the admin server 110. In the embodiment illustrated, the admin server 110 includes an admin electronic processor 205 (for example, a microprocessor, or other electronic controller), admin memory 210, and an admin transceiver 215. The admin electronic processor 205, the admin memory 210, the admin transceiver 215, as well as other various modules (not shown) are coupled by a bus 220, or are coupled directly, by one or more additional control or data buses, or a combination thereof. In alternate embodiments, the admin server 110 may include fewer or additional components in configurations different from that illustrated in FIG. 2.

The admin memory 210 includes read only memory (ROM), random access memory (RAM), other non-transitory computer-readable media, or a combination thereof. The admin electronic processor 205 is configured to retrieve instructions and data from the admin memory 210 and execute, among other things, instructions to perform the methods described herein.

The admin transceiver 215 transmits signals to the communication network 105 and receives signals from the communication network 105. In some embodiments, signals include, for example, admin keys, portions of admin keys, authentication requests, requests for performing admin operations, operations results, data, data packets, or any combination thereof. In some embodiments, the admin transceiver 215 includes a separate transmitter and receiver.

In some embodiments, the microservice server 115, the bootstrap server 120, the secret management server 125, and the endpoint server 130 include components or combinations of different components, including all or some of the various components described above with respect to the admin server 110 (for example, an electronic processor, memory, and a transceiver). As a consequence, these components are not described in detail or explicitly illustrated. In some embodiments, the secret management server 125 (or secret management service) includes a secure password vault. In some embodiments, the endpoint server 130 includes an application server, a database, or a different microservice server (for example, a second microservice server).

The functionality described herein as being performed by a single server may be distributed among a plurality of servers. For example, the functionality performed by the admin server 110 described herein (or a portion thereof) may be distributed among a plurality of servers. In some embodiments, the term "server" is defined as the combination of software and hardware included in one or more electrical computing devices that runs application service processes. For example, the microservice server 115 can be defined as the combination of software and hardware included in one or more electrical computing devices that runs application processes of a microservice.

Microservices are an architectural computing style in which each application is composed of a suite of microservices. Each of these microservices runs its own application processes and communicates with light weight mechanisms (for example, application program interfaces (APIs)). Microservices can be employed in cloud computing services, and different microservices of an application can be distributed across one or more cloud computing services.

For example, the functionality of an application can be segregated into a plurality of microservices. The plurality of microservices are deployed across a plurality of microservice servers. Each of these microservice servers can hold one or more different microservices from one or more different applications. In some embodiments, in the context of microservices, the term "server" is defined as the combination of software and hardware included in one or more electrical computing devices that institute virtual machines or containers in which microservices run.

Performing admin operations on the endpoint server 130 requires administrative level privilege. Admin keys are used to verify and allow mircroservices (for example, the microservice server 115) temporary administrative level access to the endpoint server 130 to perform admin operations on the endpoint server 130. These resources often do not include sufficient protection to prevent unwanted extraction of admin keys. For example, the microservice server 115 may not include secure key storage or firewalls. The systems and methods described herein limit the exposure of admin keys by generating one time use admin keys and by partitioning the admin keys into multiple portions such that the admin keys are not stored in unsecure resources for longer than necessary to perform an admin operation.

Figure 3:
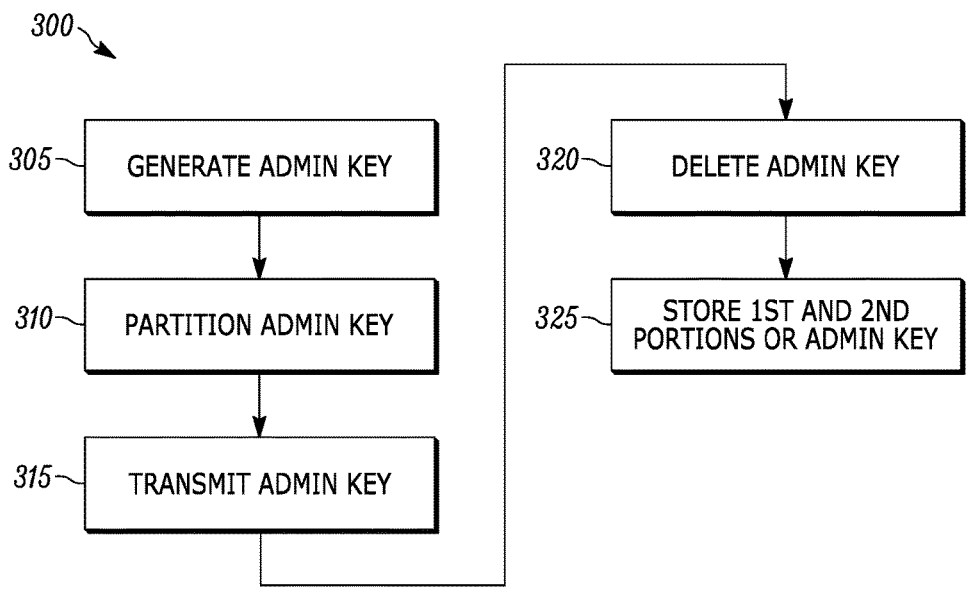
FIG. 3 is a flowchart of a method of generating an admin key on a bootstrap server included in the communication system of FIG. 1, in accordance with some embodiments.

A bootstrap service (for example, the bootstrap server 120) generates and partitions one time use admin keys. FIG. 3 illustrates an example method 300 of generating an admin key on the bootstrap server 120. In the example illustrated, the bootstrap server 120 generates an admin key (at block 305). As used herein, the term "key," may refer to a single key, a plurality of keys, a single key pair, a plurality of key pairs, or any combination thereof. As described in more detail below, the endpoint server 130 uses the admin key to verify and allow outside resources administrative level access to the endpoint server 130. In some embodiments, the bootstrap server 120 generates one time use admin keys specifically for use by a particular microservice. In alterative embodiments, the bootstrap server 120 generates one time use admin keys for use by any authorized microservice.

At block 310, the bootstrap server 120 partitions the admin key into a first portion and a second portion. For example, the bootstrap server 120 divides (or splits) the admin key into a first portion and a second portion. In some embodiments, the bootstrap server 120 partitions the admin key into more than two portions.

At block 315, the bootstrap server 120 transmits the admin key to the endpoint server 130. Upon receiving the admin key, the endpoint server 130 updates its admin key to the newly received admin key.

At block 320, the bootstrap server 120 deletes the admin key from a memory included in the bootstrap server 120. At block 325, the bootstrap server 120 stores the first and second portions of the admin key in a secret management service. For example, the bootstrap server 120 transmits the first and second portions of the admin key to the secret management server 125 for secure storage. The secret management server 125 includes a secure vault for storage of the first and second portions of the admin key. In some embodiments, the bootstrap server 120 deletes the first and second portions of the admin key from a memory included in the bootstrap server 120 after storing the first and second portions of the admin key in the secret management server 125.

As a result of the method 300 described above, copies of admins keys are only stored on the bootstrap server 120 for a limited period of time. In some embodiments, the bootstrap server 120 generates and partitions a new admin key as part of an initialization (or start-up routine) for the communication system 100. Alternatively or in addition, the bootstrap server 120 generates and partitions a new admin key after an old admin key had been used. Alternatively or in addition, the bootstrap server 120 generates and partitions a new admin key a set period of time after the generation of an old admin key.

Figure 4:
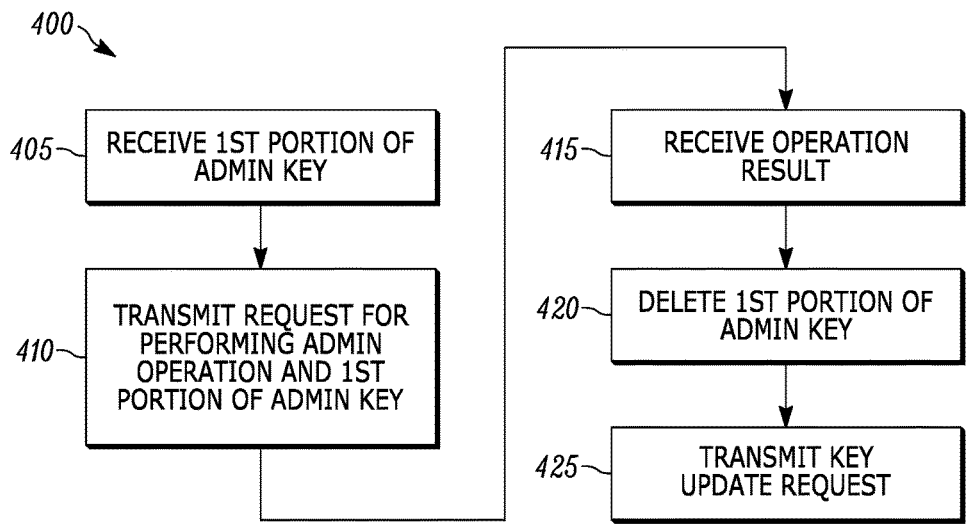
FIG. 4 is a flowchart of a method of requesting an admin operation from a microservice server included in the communication system of FIG. 1, in accordance with some embodiments.

The microservice server 115 is one example source of requests to perform admin operations on the endpoint server 130. However, the microservice server 115 does not directly perform admin operations on the endpoint server 130. Rather, in some embodiments, the microservice server 115 tasks an admin service (for example, the admin server 110) to perform admin operations on the endpoint server 130. FIG. 4 illustrates an example method 400 of requesting an admin operation from the microservice server 115. In the example illustrated, the microservice server 115 receives the first portion of the admin key from the secret management server 125 (at block 405). For example, the microservice server 115 authenticates to the secret management server 125 and receives the first portion of the admin key from the secret management server 125 when authentication is successful. Examples of authentication include mutual secure sockets layer (SSL) and lightweight directory access protocol (LDAP).

After receiving the first portion of the admin key, the microservice server 115 transmits a request for performing an admin operation on the endpoint server 130 and the first portion of the admin key to the admin server 110 (at block 410). The request indicates one or more admin operations that the microservice server 115 wants the admin server 110 to perform on the endpoint server 130. For example, the request can include instructions for the admin server 110 to create a specific type of database on the endpoint server 130. In some embodiments, the request also indicates the target endpoint server 130 (or service) which the microservice server 115 wants the admin server 110 to perform the admin operations on. For example, one request may indicate the endpoint server 130 as the target for the admin operation and another request may indicate a different server as the target for the admin operation.

As described in more detail below, the admin server 110 generates a copy of the admin key based in part on the first portion of the admin key. The admin server 110 is unable to obtain the first portion of the admin key at will. Having the microservice server 115 transmit the first portion of the admin key to the admin server 110 prevents the admin server 110 from being allowed to request all of the information necessary to construct a copy of the admin key. In some embodiments, the microservice server 115 authenticates to the admin server 110 prior to transmitting the first portion of the admin key to the admin server 110.

As described in more detail below, the admin server 110 performs the requested admin operation on the endpoint server 130 in response to receiving the request and the first portion of the admin key from the microservice server 115. The endpoint server 130 generates an operation result after the requested admin operation is performed. At block 415, the microservice server 115 receives the operation result. The operation result indicates whether the admin operation has been successfully completed. In some embodiments, the microservice server 115 receives the operation result from the admin server 110. In alternate embodiments, the microservice server 115 receives the operation result from the endpoint server 130.

After receiving the operation result, the microservice server 115 deletes the first portion of the admin key (at block 420). For example, the microservice server 115 wipes a portion of a memory that stores the first portion of the admin key on the microservice server 115. In some embodiments, the microservice server 115 deletes the first portion of the admin key in response to receiving the operation result.

Additionally, after receiving the operation result, the microservice server 115 transmits a key update request to the bootstrap server 120 (at block 425). The bootstrap server 120 generates and partitions a new (or second) admin key in response to receiving the key update request.

Figure 5:
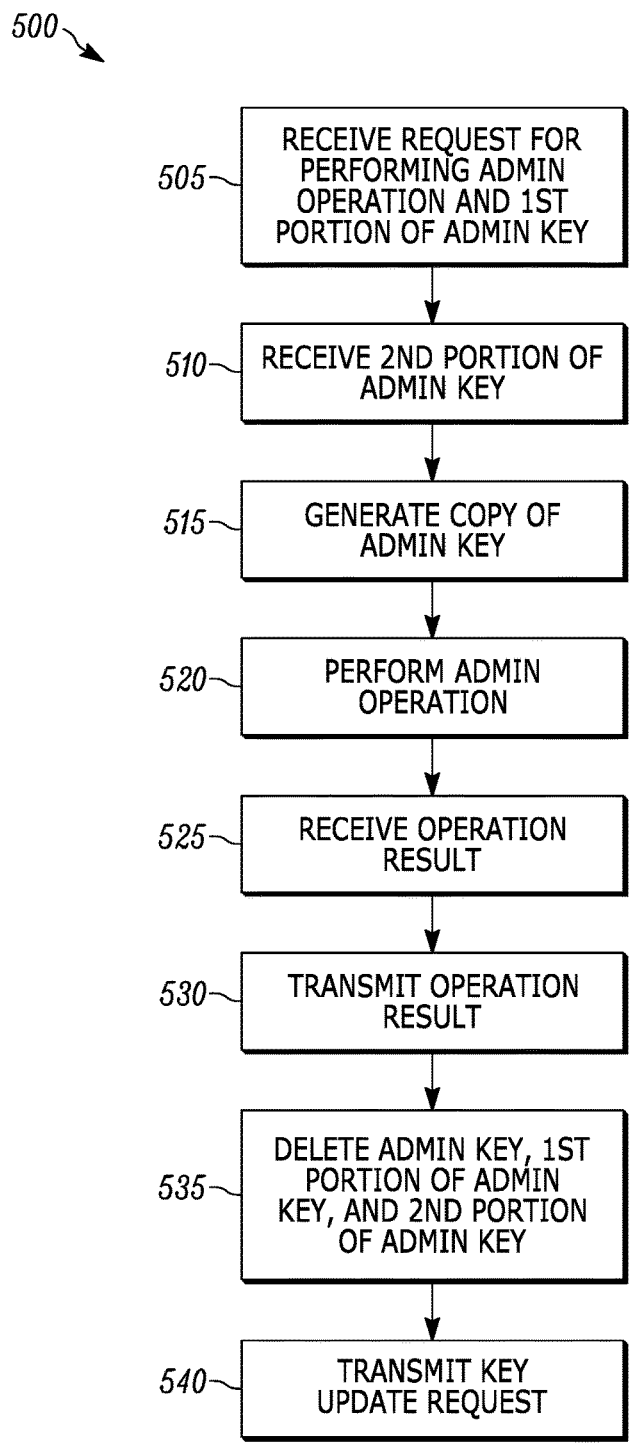
FIG. 5 is a flowchart of a method of performing an admin operation by the admin server of FIG. 2, in accordance with some embodiments.

As described above, the admin server 110 performs the requested admin operation on the endpoint server 130. FIG. 5 illustrates an example method 500 of performing an admin operation by the admin server 110. In the example illustrated, the admin server 110 receives the request for performing the admin operation on the endpoint server 130 and the first portion of the admin key from the microservice server 115 (at block 505). At block 510, the admin server 110 receives the second portion of the admin key from the secret management server 125. For example, the admin server 110 authenticates to the secret management server 125 and receives the second portion of the admin key from the secret management server 125 when authentication is successful. In alternate embodiments, the admin server 110 receives the second portion of the admin key from a different server. For example, the admin server 110 receives the second portion of the admin key from the bootstrap server 120.

At block 515, the admin server 110 generates a copy of the admin key based at least in part on the first and second portions. In some embodiments, admin server 110 generates a copy of the admin key by combining the first portion with the second portion. As a simplified example for illustrative purposes, when the first portion is ABC and the second portion is XYZ, the copy of the admin key generated by the admin server 110 is ABCXYZ.

The copy of the admin key elevates the privilege level of the admin server 110 such that the admin server 110 is able to perform admin operations on the endpoint server 130. At block 520, the admin server 110 performs the admin operation on the endpoint server 130 using the copy of the admin key. For example, the admin server 110 creates a specific database on the endpoint server 130.

As described above, the endpoint server 130 generates an operation result after the requested admin operation is performed on the endpoint server 130. The operation result indicates whether the admin operation has been successfully completed. At block 525, the admin server 110 receives the operation result from the endpoint server 130. Responsive to receiving the operation result from the endpoint server 130, the admin server 110 transmits the operation result to the microservice server 115 (at block 530).

Now that the admin operation has been performed on the endpoint server 130, the admin server 110 lowers its privilege level by deleting the admin key, the first portion of the admin key, and the second portion of the admin key (at block 535).

At block 540, the admin server 110 transmits a key update request to the bootstrap server 120. As described above, the microservice server 115 also transmits a key update request to the bootstrap server 120. The bootstrap server 120 generates and partitions a new (or second) admin key in response to receiving key update requests from the admin server 110, the microservice server 115, or both. In some embodiments, the bootstrap server 120 generates a new (or second) admin key only in response to receiving both a first key update request from the admin server 110 and a second key request from the microservice server 115. In alternate embodiments, the bootstrap server 120 generates a new admin key only in response to receiving a first key update request from the admin server 110. In alternate embodiments, the bootstrap server 120 generates a new admin key only in response to receiving a second key update request from the microservice server 115.

Figure 6A:
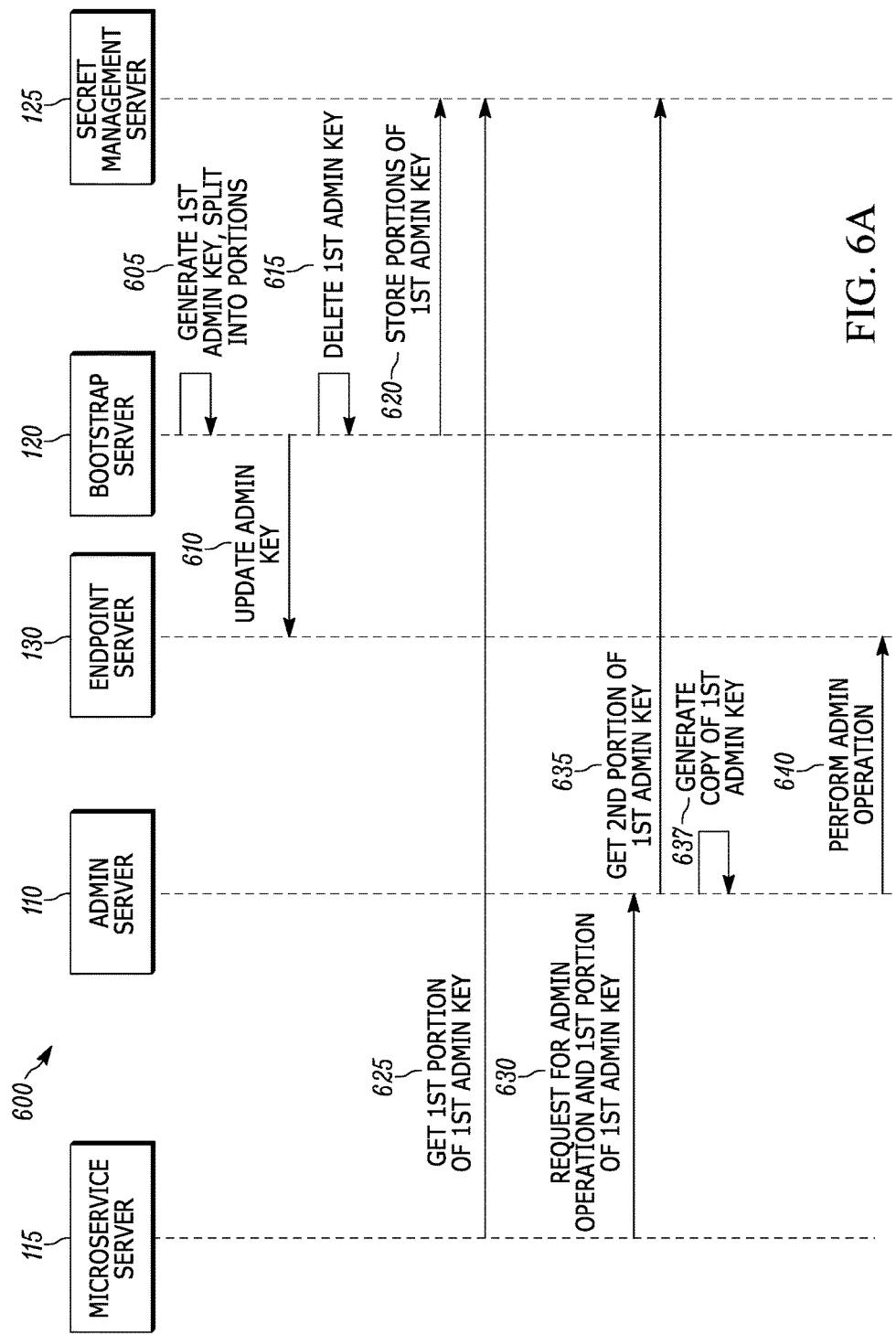
FIG. 6A is a sequence diagram of a portion of a method of providing administrative access to an endpoint server included in the communication system of FIG. 1, in accordance with some embodiments.
Figure 6B:
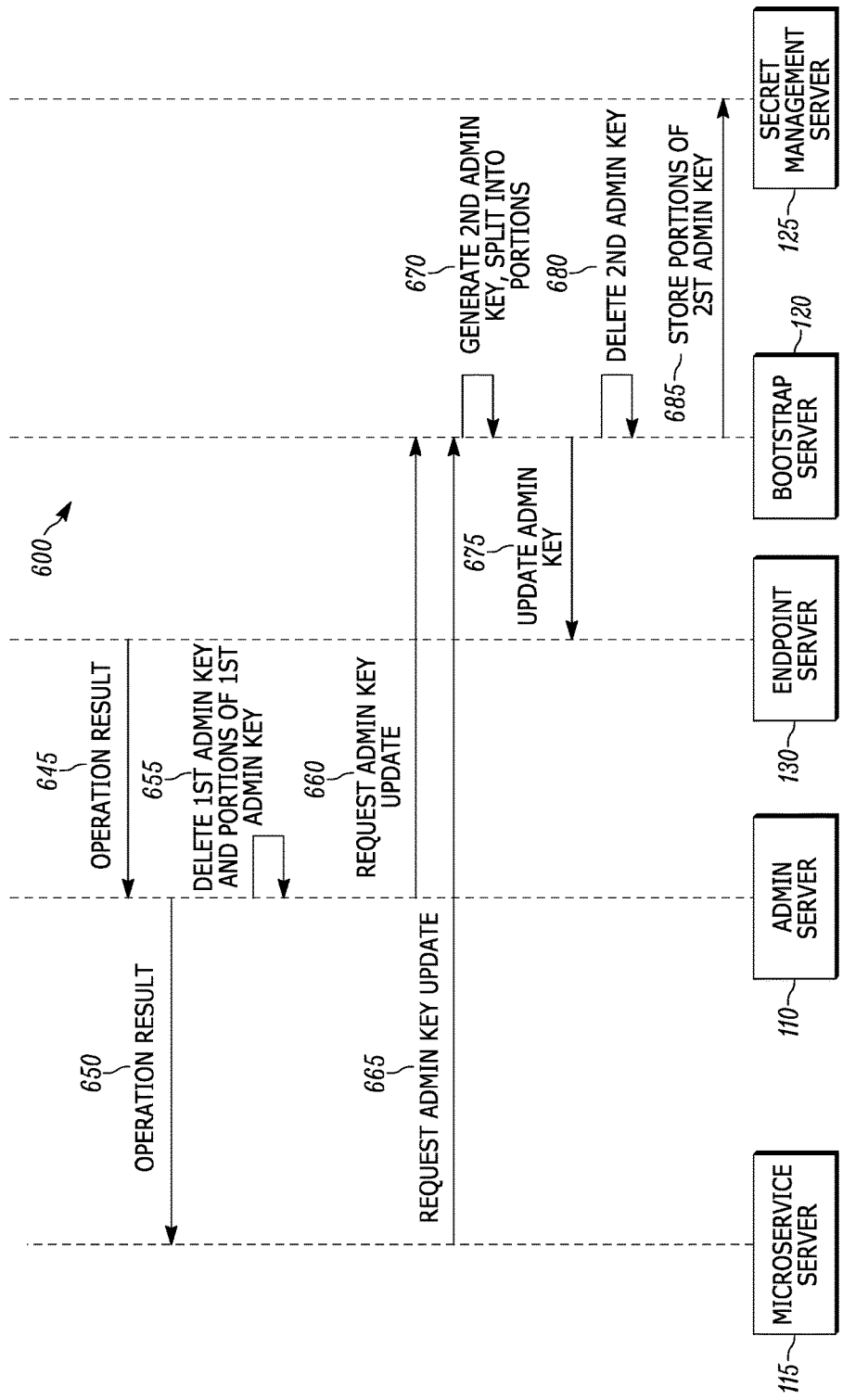
FIG. 6B is a sequence diagram of another portion of the method of providing administrative access to an endpoint server included in the communication system of FIG. 1.

The methods 300, 400, and 500 described above are discussed in terms of the individual component of the communication system 100. FIGS. 6A and 6B illustrate an example method 600 of providing administrative access to the endpoint server 130. The method 600 described below is an example combination of the methods 300, 400, and 500 described above, and further illustrates how the different components of the communication system 100 interact with each other to provide administrative access to the endpoint server 130.

At step 605 in FIG. 6A, the bootstrap server 120 generates a first admin key and splits the first admin key into a first portion and a second portion. At step 610, the bootstrap server 120 updates the admin key of the endpoint server 130 by transmitting the first admin key to the endpoint server 130. At step 615, the bootstrap server 120 deletes the first admin key. At step 620, the bootstrap server 120 stores the first and second portions of the first admin key in the secret management server 125.

At step 625, the microservice server 115 gets the first portion of the first admin key from the secret management server 125. At step 630, the microservice server 115 transmits a request for performing an admin operation on the endpoint server 130 and the first portion of the first admin key to the admin server 110. At step 635, the admin server 110 gets the second portion of the first admin key from the secret management server 125. At step 637, the admin server 110 creates a copy of the first admin key using the first and second portions of the admin key. At step 640, the admin server 110 performs the admin operation on the endpoint server 130 using the copy of the admin key.

At step 645 in FIG. 6B, the operation result is returned from the endpoint server 130 to the admin server 110. At step 650, the operation result is returned from the admin server 110 to the microservice server 115. At step 655, the admin server 110 deletes the first admin key, the first portion of the first admin key, and the second portion of the first admin key. At step 660, the admin server 110 sends a request to the bootstrap server 120 to update the admin key. At step 665, the microservice server 115 sends a request to the bootstrap server 120 to update the admin key.

At step 670, the bootstrap server 120 generates a second admin key and splits the second admin key into a third portion and a fourth portion. At step 675, the bootstrap server 120 updates the admin key of the endpoint server 130 by transmitting the second admin key to the endpoint server 130. At step 680, the bootstrap server 120 deletes the second admin key. At step 685, the bootstrap server 120 stores the third and fourth portions of the second admin key in the secret management server 125.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method of providing administrative access to an endpoint server, the method comprising:
   responsive to receiving a key update request at a bootstrap server,
      generating an admin key at the bootstrap server,
      partitioning, at the bootstrap server, the admin key into a first portion and a second portion,
      transmitting, from the bootstrap server, the admin key to the endpoint server,
      deleting the admin key from the bootstrap server after transmitting the admin key to the endpoint server, and
      storing, at the bootstrap server, the first portion and the second portion of the admin key in a secret management server;
   receiving, at an admin server, a request for performing an admin operation on the endpoint server and the first portion of the admin key from a microservice server;
   receiving, at the admin server, the second portion of the admin key;
   generating, at the admin server, a copy of the admin key based at least in part on the first portion and the second portion of the admin key;
   performing, via the admin server, the admin operation on the endpoint server using the copy of the admin key;
   deleting the copy of the admin key on the admin server after performing the admin operation on the endpoint server;
   transmitting, from the admin server, a first key update request to the bootstrap server; and
   transmitting, from the microservice server, a second key update request to the bootstrap server.

2. The method of claim 1, wherein the admin server receives the second portion of the admin key from the secret management server.

3. The method of claim 2, further comprising authenticating the admin server to the secret management server prior to receiving the second portion of the admin key.

4. The method of claim 2, further comprising
   receiving, at the microservice server, the first portion of the admin key from the secret management server, wherein the microservice server is unable to obtain the second portion of the admin key;
   transmitting, from the microservice server, the request for performing the admin operation on the endpoint server to the admin server; and
   transmitting, from the microservice server, the first portion of the admin key to the admin server.

5. The method of claim 4, further comprising authenticating the microservice server to the secret management server prior to receiving the first portion of the admin key.

6. The method of claim 1, wherein the admin key is a first admin key, the method further comprising
   responsive to receiving the first and second key update requests at the bootstrap server generating a second admin key at the bootstrap server,
      partitioning, at the bootstrap server, the second admin key into a third portion and a fourth portion,
      transmitting, from the bootstrap server, the second admin key to the endpoint server,
      deleting the second admin key from the bootstrap server after transmitting the second admin key to the endpoint server, and
      storing, at the bootstrap server, the third portion and the fourth portion of the second admin key in the secret management server.

7. The method of claim 1, further comprising
   receiving, at the admin server, an operation result from the endpoint server after performing the admin operation on the endpoint server; and
   transmitting, from the admin server, the operation result to the microservice server.

8. The method of claim 1, wherein the microservice server is a first microservice server, wherein the endpoint server includes at least one selected from a group consisting of an application server, a second microservice server, and a database.

9. A system of providing administrative access to an endpoint server, the system comprising:
   a bootstrap server including a bootstrap transceiver, a bootstrap memory, and a bootstrap electronic processor electrically coupled to the bootstrap transceiver and the bootstrap memory, wherein responsive to receiving a key update request, the bootstrap electronic processor configured to
      generate an admin key,
      divide the admin key into an first portion and an second portion,
      transmit, via the bootstrap transceiver, the admin key to the endpoint server;
      delete the admin key from the bootstrap memory after transmitting the admin key, and
      store the first portion and the second portion of the admin key in a secret management server;
   a microservice server; and
   an admin server including an admin transceiver, an admin memory, and an admin electronic processor electrically coupled to the admin transceiver and to the admin memory, the admin electronic processor configured to
      receive, via the admin transceiver, a request for performing an admin operation on the endpoint server and the first portion of the admin key from the microservice server,
      receive, via the admin transceiver, the second portion of the admin key,
      generate a copy of the admin key based at least in part on the first portion and the second portion of the admin key,
      perform the admin operation on the endpoint server using the copy of the admin key,
      delete the copy of the admin key stored in the admin memory after performing the admin operation on the endpoint server, and
      transmit, via the admin transceiver, a first key update request to the bootstrap server, wherein the microservice server is configured to transmit, via a microservice transceiver, a second key update request to the bootstrap server.

10. The system of claim 9, wherein the admin electronic processor receives the second portion of the admin key from the secret management server.

11. The system of claim 10, wherein the admin electronic processor is further configured to authenticate to the secret management server prior to receiving the second portion of the admin key.

12. The system of claim 10, wherein the microservice server includes a microservice transceiver and a microservice electronic processor electrically coupled to the microservice transceiver, the microservice electronic processor configured to
receive, via the microservice transceiver, the first portion of the admin key from the secret management server, wherein the microservice server is unable to obtain the second portion of the admin key, and
transmit, via the microservice transceiver, the request for performing the admin operation on the endpoint server and the first portion of the admin key to the admin server.

13. The system of claim 12, wherein the microservice electronic processor is further configured to authenticate to the secret management server prior to receiving the first portion of the admin key.

14. The system of claim 9, wherein the admin key is a first admin key, wherein responsive to receiving the first and second key update requests, the bootstrap electronic processor is further configured to
generate a second admin key,
divide the second admin key into a third portion and a fourth portion,
transmit, via the bootstrap transceiver, the second admin key to the endpoint server,
delete the second admin key from the bootstrap memory after transmitting the second admin key, and
store the third portion and the fourth portion of the second admin key in the secret management server.

15. The system of claim 9, wherein the admin electronic processor is further configured to
receive, via the admin transceiver, an operation result from the endpoint server after performing the admin operation on the endpoint server; and
transmit, via the admin transceiver, the operation result to the microservice server.

16. The system of claim 9, wherein the microservice server is a first microservice server, wherein the endpoint server includes at least one selected from a group consisting of an application server, a second microservice server, and a database.

* * * * *